United States Patent [19]

Tsukamoto et al.

[11] Patent Number: 4,793,928

[45] Date of Patent: Dec. 27, 1988

[54] POLYMER FILTERING APPARATUS

[75] Inventors: Tsugio Tsukamoto; Tsuneo Inose, both of Soka, Japan

[73] Assignee: SMC Corporation, Tokyo, Japan

[21] Appl. No.: 15,856

[22] PCT Filed: Apr. 25, 1986

[86] PCT No.: PCT/JP86/00205

§ 371 Date: Feb. 25, 1987

§ 102(e) Date: Feb. 25, 1987

[87] PCT Pub. No.: WO86/06317

PCT Pub. Date: Nov. 6, 1986

[30] Foreign Application Priority Data

Apr. 27, 1985 [JP] Japan .................. 60-62647

[51] Int. Cl.$^4$ .................. B01D 25/02; B01D 29/34
[52] U.S. Cl. .................. 210/344; 210/345; 210/346; 210/486; 210/488; 210/492
[58] Field of Search .............. 210/344, 345, 346, 486, 210/488, 492

[56] References Cited

U.S. PATENT DOCUMENTS

| 2,654,440 | 10/1953 | Robinson | 210/492 |
| 2,770,370 | 11/1956 | Griffiths | 210/488 |
| 3,141,845 | 7/1964 | Nadherny | 210/488 |
| 3,165,471 | 1/1965 | Hencken | 210/488 |
| 4,132,649 | 1/1979 | Croopnick et al. | 210/488 |
| 4,221,663 | 9/1980 | Little | 210/486 |

FOREIGN PATENT DOCUMENTS

| 43887 | 3/1966 | Fed. Rep. of Germany | 210/486 |
| 50-153589 | 12/1975 | Japan . | |
| 54-32885 | 3/1979 | Japan . | |

Primary Examiner—Benoit Castel
Assistant Examiner—Richard D. Jordan
Attorney, Agent, or Firm—Oblon, Fisher, Spivak, McClelland & Maier

[57] ABSTRACT

A polymer filtering apparatus (1) is used to filter a molten polymer in a step of extruding a molten polymer to manufacture films and fibers. A plate type filter medium (4), which is incapable of resisting a filtration pressure, is supported at its rear portion on a liquid-permeable support member (5). Two pieces of filter media (4), (4) of the above-mentioned construction are arranged in opposition to each other so as to form a polymer passage (10) therebetween, and a polymer to be filtered is fed from this polymer passage (10) and through the filter medium (4) and support member (5). The plate type filter medium (4) and support member (5), which are detachably piled, can be separated, and the surfaces thereof can be easily washed. Moreover, the results of washing of both the primary and secondary sides can be inspected visually with ease.

21 Claims, 3 Drawing Sheets

4,793,928

POLYMER FILTERING APPARATUS

BACKGROUND OF THE INVENTION

1. Field of the Invention

This invention relates to a polymer filtering apparatus particularly suitable for use in the production of films and fiber of polymers such as polyester, polyamide and the like.

2. Prior Art

When producing fiber or films by extruding a molten polymer through a nozzle or die, it is a matter of upmost importance to remove foreign matter from the polymer in order to obtain a product of satisfactory quality. For this purpose, there have been proposed and used various filters. For instance, there has been known in the art the so-called leaf filter which is constituted by a couple of filter members (hereinafter referred to as "fiber filters") stacked one on the other, each consisting of a thin disk-like metal fiber sinter with an opening at the center thereof, the filter members being secured to each other, for example, by welding outer peripheral portions thereof, a wire netting of a large mesh size interposed between the filter members to form a gap space therebetween, and a porous plate for supporting the fiber filters. A filtering apparatus is formed by stacking a large number of such leaf filters one on another around the circumference of a support column (referred to as "polymer duct") which is centrally provided with a polymer passage. The polymer to be filtered is fed from outside of the leaf filters and passed through the fiber filters to enter the internal gap spaces and sent into the polymer duct through the center openings. During the filtering operation, each fiber filter which is insufficient in rigidity for withstanding the filtration pressure by itself is supported by the porous plate and wire netting.

The leaf filter of the above-described construction has a broad filtration area and employs fiber filters with narrow interstices, so that it is capable of removing foreign matter with high efficiency, and it is widely used in the art. However, such a leaf filter has a number of problems to be solved. Namely, the fiber filter is very costly, and therefore it is desired to be easily washable for repeated use. Nevertheless, a difficulty is encountered in washing the interior of the filter which is closed along its outer periphery. Besides, eye inspection of the filter which is usually required after washing to ascertain the effects of washing, especially inspection of the secondary side of the filter which forms an exit for the polymer, is impossible because it is located on the inner side of the filter. Insufficient washing of the secondary side leaves the possibilities of the dust or other foreign matter on the secondary side mixing into the polymer during the filtering operation.

OBJECT OF THE INVENTION

It is therefore an object of the present invention to eliminate the above-mentioned drawbacks or problems of the conventional counterparts, and, more particularly, to provide a polymer filtering apparatus which permits easy washing as well as eye inspection of both primary and secondary sides thereof.

SUMMARY OF THE INVENTION

In order to achieve these objects, the polymer filtering apparatus of the invention comprises a stack of paired flat plate-like filter members detachably fitted around the circumference of a polymer duct and a number of flat platelike liquid-permeable support members detachably fitted around the circumference of the polymer duct on the upper and lower sides of the coupled filter members for supporting effective surfaces thereof, the filter members being located at a space from each other to form a polymer passage therebetween, which polymer passage has a polymer inlet either at the inner or outer periphery thereof, and said support members having a polymer outlet on the side away from the polymer inlet.

With the polymer filtering apparatus having the above-described construction according to the invention, each couple of the filter members which are supported by overlying or underlying liquid permeable support members are located in face-to-face relation, forming therebetween a polymer passage into which a polymer to be filtered is fed through the support members. The flat plate-like filter members and support members are detachably stacked, so that they can be easily disassembled for cleaning their surfaces or for other purposes, and the results of washing on the primary and secondary sides can be easily inspected with naked eyes.

The above and other objects, features and advantages of the invention will become more apparent from the following description and the appended claims, taken in conjunction with the accompanying drawings which show by way of example preferred embodiments of the invention.

DESCRIPTION OF PREFERRED EMBODIMENTS

Figure 1:
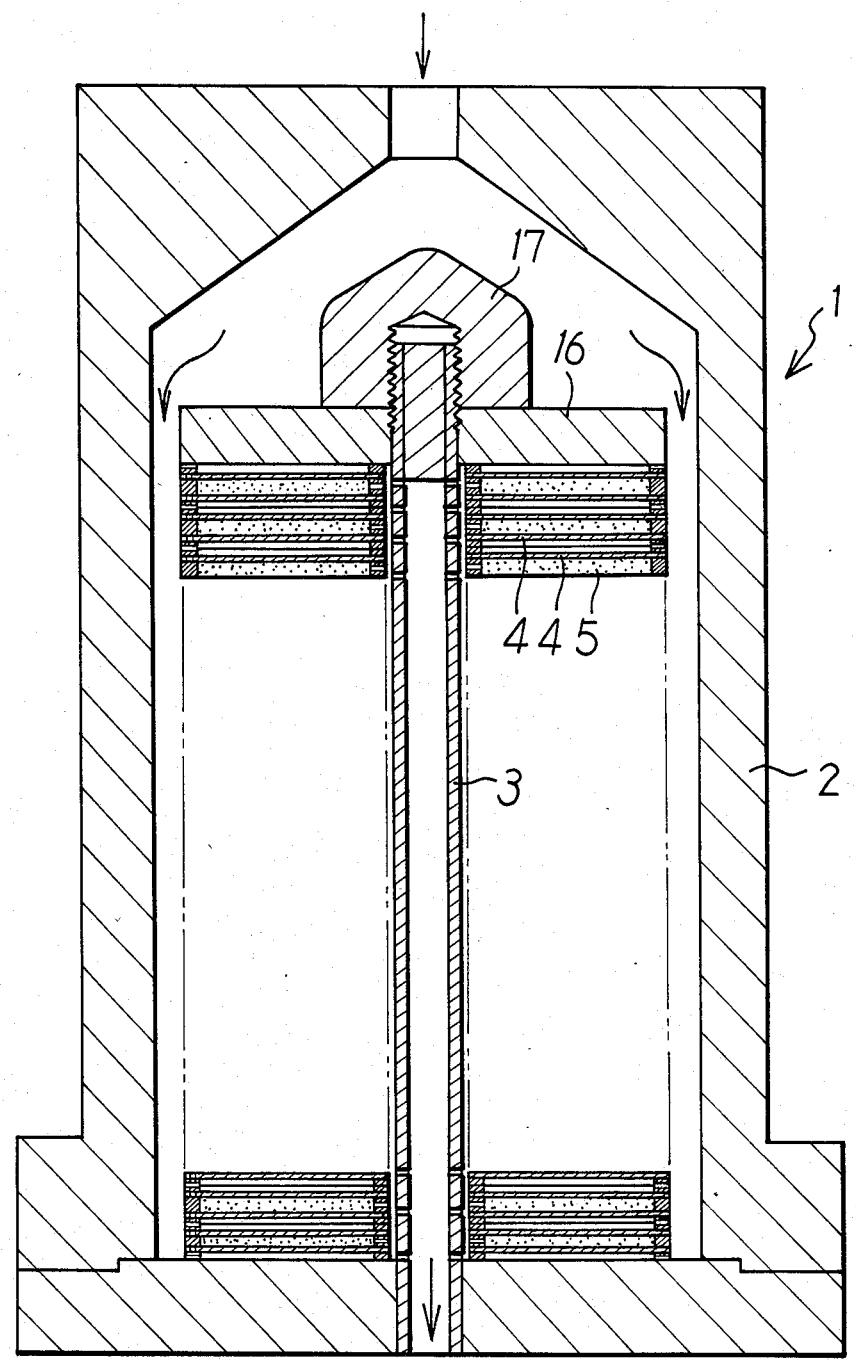
FIG. 1 is a schematic sectional view of a polymer filtering apparatus according to the invention.

Now, the invention is described more particularly by way of preferred embodiments shown in the drawings.

Referring to FIG. 1, there is shown in section an embodiment of the invention, in which the polymer filtering apparatus indicated generally by the reference numeral 1 has a cylindrical casing 2, a vertically extending polymer duct 3 located substantially at the center of the casing 2, and a large number of disk-like filter members 4 and support members 5 stacked around the circumference of the polymer duct 3. As illustrated on en enlarged scale in FIG. 2, couples of the filter members 4 are stacked alternately with a support member 5.

Figure 2:
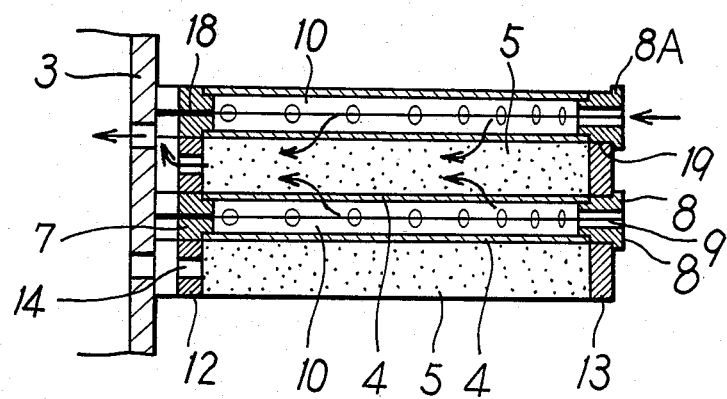
FIG. 2 is a fragmentary sectional view on an enlarged scale of filter members and support members employed in the embodiment of FIG. 1.
Figure 3:
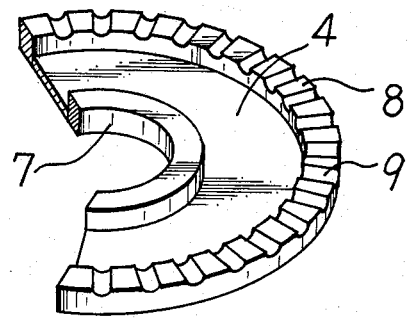
FIG. 3 is a fragmentary perspective view of the filter member.

As shown in FIG. 3, each filter member 4 has an inner hub ring 7 and an outer hub ring 8 securely fixed to the inner and outer peripheries thereof by welding or other suitable means. The outer hub ring 8 is formed with a large number of radial grooves 9 at suitable intervals. As shown particularly in FIG. 2, a couple of filter members 4 are overlapped with the respective inner and outer hub rings 7 and 8 in contact with each other, so that the filter members 4 are spaced from each other by a suitable distance to form a polymer passage 10 therebetween. The inner periphery of the polymer passage 10 is closed by the inner hub rings 7, while its outer periphery is provided with polymer inlets which are formed by the radial grooves 9 in the outer hub rings 8. Although the inner and outer hub rings 7 and 8 are fixed to the filter member 4 in the illustrated embodiment, they may be provided as separate parts and inserted between the filter members 4 when assembling same. In such a case, there is no need for providing the inner and outer hub rings 7 and 8 for each one of the overlapped filter members as shown in FIG. 2, since, it suffices to insert one inner hub ring and one outer hub ring which is provided with radial holes as the polymer inlets instead of the above-described radial grooves 9.

As the filter members 4, there may be employed the fiber filter which have been conventionally used for the leaf filter--that is to say, the fiber filters which are obtained by sintering non-woven fabric of fine and long metal fiber. The fiber diameter, openness of interstices and thickness of the fiber filter are determined suitably according to the required polymer filtering accuracy. Normally, the fiber filter has an openness of 3–40 microns and a thickness of 0.2–2 mm. In place of the fiber filter, there may be employed a sinter of metal granules, short metal fiber or the like. The filter members 4 to be used in the present invention are formed in a relatively small thickness in consideration of the polymer filtration pressure and washability, and therefore singly do not have a rigidity for enduring the filtration pressure.

The disk-like support member 5 has a rigidity sufficient for enduring the filtration pressure to support the effective surfaces of the overlying and underlying filter members 4 against the filtration pressure, along with liquid permeability to pass the polymer in radial directions. A support member 5 with such properties can be obtained by forming the same integrally from a sintered metal plate with an extremely high porosity. However, the support member 5 is not restricted to such a sintered metal plate of an integral structure because various alterations are possible. For example, it may be constituted by a combination of a couple of porous plates and a wire netting of a large mesh size which serves to maintain a suitable gap space between the two porous plates as seen in the conventional leaf filtes, or by a liquid permeable sintered metal plate instead of the just-mentioned porous plates. Alternatively, it may be formed by overlapping a couple of sintered metal plates which are provided with a large number of radial grooves on the respective meeting sides to permit polymer flows therethrough.

Figure 4:
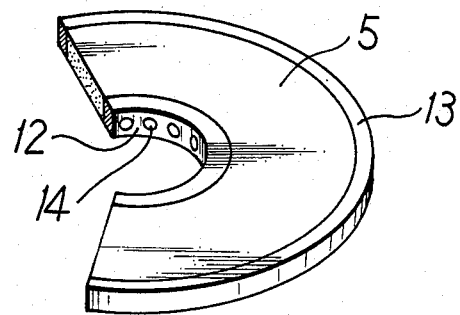
FIG. 4 is a fragmentary perspective view of the support member.

As illustrated in FIGS. 2 and 4, the support member 5 has inner and outer hub rings 12 and 13 securely fixed to its inner and outer peripheries, respectively. The inner hub ring 12 is formed with polymer discharge ports 14. The sintered metal plate which constitutes the support member 5 is greater than the filter member 4 in the degree of openness to minimize the resistance of passage of the polymer and to prevent blocking by solid foreign matter which may be contained in the polymer. Materials of various shapes such as granules, short fiber, long fiber and the like can be used for forming the sintered support plate, but it is preferred to employ a spherical or ball-like material with smooth surfaces, for example, steel balls with low resistance to polymer passage. Although it is desirable to employ steel balls of a large size from the standpoint of reducing the resistance to polymer passage, steel balls of a smaller size are desirable from the standpoint of supporting the filter members stably. In consideration of these contrary factors, it is preferred to employ a size in the range of 1.0–0.1 mm. Long metal fiber with smooth surfaces is also preferred. Sinter which has long metal fiber filaments arranged three-dimensionally in random directions is also suitable for the support member 5 since it has an extremely large porosity, with low resistance to polymer passage especially in a lateral direction (in a direction parallel with the upper and lower sides) and insusceptibility of defoliation of metal fiber under the filtration pressure. The diameter of the long metal fiber to be used for the support member is preferred to be in the range of about 1.0–0.1 mm, more preferably in the range of 0.3–0.6 mm. The sintered metal plate may consist of a plate as obtained by sintering metal particles, or short or long metal fiber with or without grinding the filter-contacting surfaces for flattening the exposed grains to support the filter stably without deformations.

Although the sintered metal plate which constitutes the support member 5 is arranged to support the filter member 4 in direct contact therewith in the particular embodiment shown, a secondary filter may be interposed between them if desired. In such a case, it is desirable to employ a secondary filter which has a function of catching and rupturing gel in addition to a function of mixing the polymer, for example, a sinter of deformed metal particles with a multitude of sharp edges or a sinter of deformed short metal fiber with a multitude of sharp edges. Sinters of deformed particles or short fiber are particularly suitable in view of the high porosity, low resistance to polymer passage and functions of catching and rupturing the gel in the polymer. The degree of openess of the secondary filter is preferred to be greater than that of the filter member 4 to prevent blocking by solid foreign matter which has passed through the filter member 4 and to facilitate its washing and reuse. The secondary filter may be fixedly or detachably bonded to the opposite sides of the support member 5. It is also possible to form the support member 5 from a sinter of the above-mentioned deformed metal particles or short fiber to impart thereto the functions of the secondary filter.

As shown in FIG. 1, a holder plate 16 and a nut 17 is mounted on top of the filter and support members 4 and 5 which are stacked around the circumference of the polymer duct 3. The holder plate 16 presses down and seals the inner hub rings 7 and 12 as well as the outer hub rings 8 and 13. If necessary, suitable seal material 18 and 19 is interposed between the inner 7, 12 and outer 8, 13 hub rings. In FIG. 2, the outer hub rings 8 of the filter members 4 are each provided with an annular projection 8A around the rspective circumference, which projection 8A is fittingly engageable with the outer hub ring 13 of the adjacent support member 5, facilitating to assembly of the seal material 19 and support members 5 in predetermined positions. The projections 8A may be provided on the part of the outer hub rings 13 of the support members 5 if desired.

The polymer filtering apparatus with the above-describd construction operates in the manner as follows.

A polymer which is fed into the casing 2 from above in FIG. 1 flows into the polymer passages 10 between the coupled filter members 4 through the polymer inlets 9 in the outer hub rings 8 as shown in FIG. 2. The polymer which has been passed through the filter members 4 is permitted to flow through the support members 5 in radially inward directions and collected in the polymer duct 3 through the polymer discharge ports 14 in the inner hub rings 12 and then discharged from the apparatus. In this filtering operation, the filter members 4 are suitably protected against the filtration pressure by the overlying or underlying support members 5, although the filter members 4 per se are not capable or enduring the filtration pressure.

For washing the filter and support members 4 and 5, they are removed from the polymer duct 3 and washed respectively. Since the filter member 4 is simply in the form of a disk as shown in FIG. 3, it is quite easy to wash and visually inspect the opposite filter surfaces. The support member 5 can be washed and visually inspected in a similar manner.

In the foregoing embodiment, the polymer is fed into the polymer passage between each couple of filter members 4 through the outer hub rings 8 and discharged into the polymer duct 3 through the inner hub rings 12. However, it is possible to filter the polymer in the opposite direction namely, by providing inlet grooves in the inner hub rings 7 of the filter members 4 and closing the polymer passages 10 with outer hub rings 8 at the respective outer peripheries, while providing polymer outlets in the outer hub rings 13 of the support members 5 which are closed with the inner hub rings 12 at the respective inner peripheries. With this arrangement, the polymer which is fed from the polymer duct 3 into the polymer passages 10 between the coupled filter members 4 flows into the support members 5 through the filter members 4 and then in radially outward directions through the support members 5. The polymer which is discharged into the casing 2 is sent out through its top.

Figure 5:
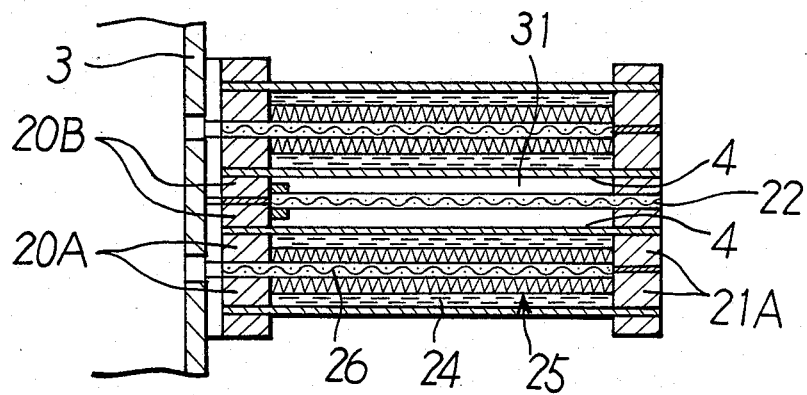
FIG. 5 is a view similar to FIG. 2 but showing another embodiment of the invention.
Figure 6:
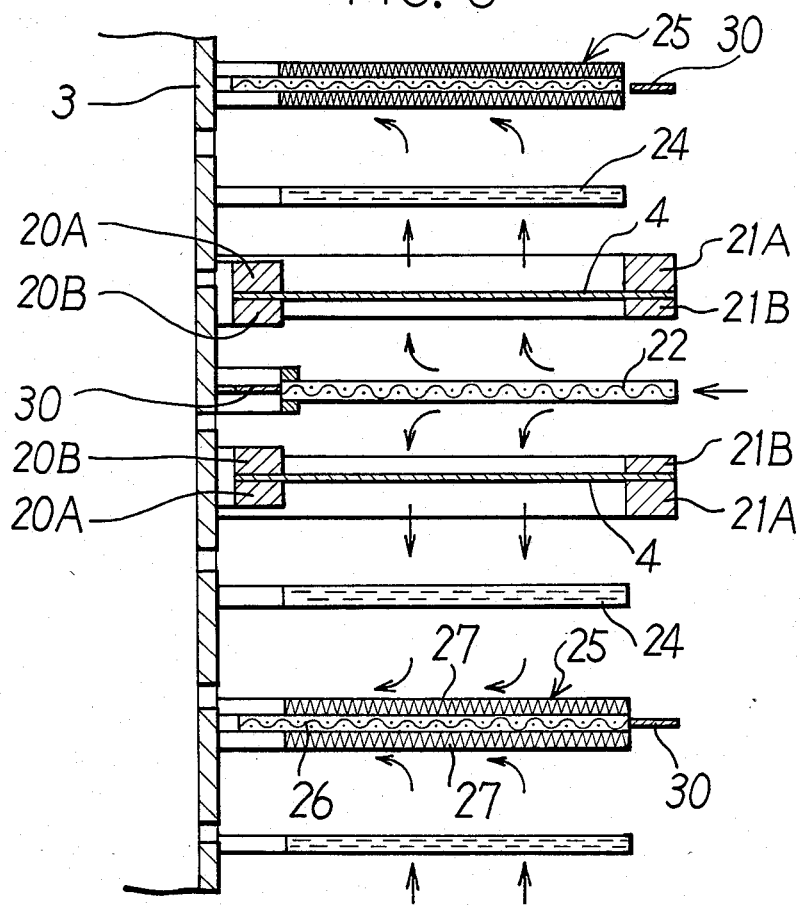
FIG. 6 is a sectional view showing the respective components of FIG. 5 in disassembled state.

Referring to FIG. 5, there is shown another embodiment of the invention in a sectional view similar to FIG. 2. FIG. 6 shows the components of the filtering apparatus of FIG. 5 in disassembled state. In this embodiment, each disk-like filter member 4 has inner hub rings 20A and 20B and outer hub rings 21A and 21B securely fixed on the upper and lower sides of its inner and outer peripheries, respectively, by welding, brazing or other suitable means. An annular spacer 22 (for example, a wire netting of a large mesh size) is interposed between the outer hub rings 21B between the filter members 4. Positioned on the outer sides of the coupled filter members 4 are secondary filter members 24 of sintered metal and support members 25. Each support member 25 is formed by producing sintered metal plates 27 integrally on the opposite sides of a wire netting 26 which is extended to a position where it is gripped between the inner hub rings 20A. The sintered metal plate 27 is preferred to be a sinter with high porosity and low resistance to polymer passage, desirably a sinter containing long metal fiber filaments extending three-dimensionally in random directions, especially in zig-zag forms in vertical directions. The reference numeral 30 denotes a seal material.

The above-described component parts are stacked in the manner as shown in FIG. 5, defining between a pair of filter members 4 a polymer passage 31 having a polymer inlet formed at its outer periphery by the annular spacer 22 and closed at its inner periphery. On the other hand, polymer outlets are formed by wire nettings at the inner peripheries of the secondary filter members 24 and support members 25 which are closed at the outer peripheries. As indicated by arrows in FIG. 6, the polymer which is fed to the polymer passage between the filter members 4 is likewise filtered by passing the same through the filter members 4 and then through the secondary filter members 24 to flow into the support members 25. The filter members 4, secondary filter members 24 and support members 25 can be washed wholly as they can be disassembled easily. In case a polymer is fed from the polymer duct 3, a polymer inlet is formed by interposing the annular spacer 22 between the opposing inner hub rings 20B while closing the outer hub rings 21B. On the other hand, the inner periphery of the support member 25 is closed with the inner hub rings 20A, and a polymer outlet is formed at its outer periphery by the wire netting 26.

Although filter and support members of circular shapes are employed in the foregoing embodiments, they are not restricted to circular shapes and may be formed in rectangular or other arbitrary shapes.

As described hreinbefore, the filter and support members of the invention are detachable from the polymer duct, and the filter members are in the form of a simple flat plate, so that they permit easy washing and inspection of both sides, in contrast to the conventional filters which are closed at the inner and outer peripheries. Accordingly, it is possible to confirm the condition of washed parts before reuse for precluding the problems which would be caused by defective washing. Consequently, it becomes possible to increase the number of times of recycling of the filter and support members and to cut the running cost of the filtering apparatus to a significant degree.

What is claimed is:
1. A polymer filtering apparatus comprising:
(a) a polymer duct in a form of a hollow conduit having a threaded end and a plurality of openings in a sidewall thereof forming passages leading from the exterior to the interior of said hollow conduit;
(b) a plurality of filtration stacks slidably mounted on said hollow conduit, each one of said plurality of filtration stacks comprising:
(i) a pair of non-self-supporting spaced filter members, said pair of spaced filter members defining a polymer passage therebetween, said polymer passage having an inner side adjacent said hollow conduit and an outer side;
(ii) a liquid-permeable support member having an inner side adjacent said hollow conduit and an outer side, said liquid-permeable support member being in planar supporting contact with one of said pair of spaced filter members in each pair of spaced filter members on the side opposite to said polymer passage and in planar supporting contact with one of said pair of spaced filter members in the adjacent one of said plurality of filtration stacks on the side opposite to said polymer passage in said adjacent one of said plurality of filtration stacks;
(iii) a plurality of polymer inlets in fluid communication with the outer side of said polymer passage;
(iv) the inner side of said polymer passage being closed to fluid flow;
(v) a plurality of polymer outlets in fluid communication with the inner side of said liquid-permeable support member and with said passages in said hollow conduit; and
(vi) the outer side of said liquid permeable support member being closed to fluid flow;

(c) a holder plate slidably mounted on said hollow conduit in abutting contact with the end one of said plurality of filtration stacks; and (d) a nut threaded on said threaded end of said hollow conduit so as to press said holder plate against said end one of said plurality of filtration stacks.

2. The polymer filtering apparatus of claim 1 wherein:

(a) each of said filter members has an inner hub ring and an outer hub ring securely fixed to the inner and outer peripheries thereof, respectively, and stacked one on the other with the respective outer hub rings in abutting engagement with each other;

(b) said plurality of polymer inlets are radial grooves formed in said outer hub rings; and (c) said polymer passage between each pair of spaced filter members is closed to fluid flow by said inner hub rings.

3. The polymer filtering apparatus of claim 2 wherein a liquid-permeable spacer is inserted in at least one of said polymer passages between one of said pairs of spaced filter members and gripped between said outer hub rings to form a polymer inlet thereat.

4. The polymer filtering apparatus of claim 1 wherein:

(a) an inner hub ring and an outer hub ring are inserted between each pair of spaced filter members;

(b) said polymer passage between each pair of spaced filter members is closed by said inner hub ring at the inner periphery thereof; and (c) said plurality of polymer inlets are formed through said outer hub rings.

5. The polymer filtering apparatus of claim 1 wherein at least one of said filter members is constituted by a fiber filter formed by sintering non-woven cloth of fine long metal fiber filaments with interstices of 3–40 microns and a thickness of 0.2–2 mm.

6. The polymer filtering apparatus of claim 1 wherein at least one of said filter members comprises a sinter of metal granules of short metal fibers.

7. The polymer filtering apparatus of claim 1 wherein at least one of said liquid-permeable support members comprises a sintered metal plate of a unitary structure with a high porosity.

8. The polymer filtering apparatus of claim 7 wherein said sintered metal plate is formed by a sinter of 1.0–0.1 mm diameter steel balls with smooth surfaces.

9. The polymer filtering apparatus of claim 7 wherein said sintered metal plate is formed by a sinter of 1.0–0.1 mm diameter long metal fibers with smooth surfaces, arranged three-dimensionally in random directions.

10. The polymer filtering apparatus of claim 7 wherein said sintered metal plate is comprised of ground and flattened metal grains exposed on a surface to be contacted with a filter member.

11. The polymer filtering apparatus of claim 1 wherein at least one of said liquid-permeable support members comprises a combination of two porous sintered metal plates and a wire netting of a large mesh size spacing said two sintered metal plates at a suitable distance from each other.

12. The polymer filtering apparatus of claim 1 wherein at least one of said liquid-permeable support members comprises two sintered metal plates each having a large number of radial grooves on the meeting side to form polymer passages therebetween.

13. The polymer filtering apparatus of claim 11 or 12 wherein said two sintered metal plates are formed by a sinter of 1.0–0.1 mm diameter steel balls with smooth surfaces.

14. The polymer filtering apparatus of claims 11 or 12 wherein said two sintered metal plates are formed by a sinter of 1.0–0.1 mm diameter long metal fibers with smooth surfaces, arranged three-dimensionally in random directions.

15. The polymer filtering apparatus of claims 11 or 12 wherein said two sintered metal plates comprise ground and flattened metal grains exposed on a surface to be contacted with a filter member.

16. The polymer filtering apparatus of claim 13 wherein said two sintered metal plates are formed by a sinter of 1.0–0.1 mm diameter long metal fibers with smooth surfaces, arrangd three-dimensionally in random directions.

17. The polymer filtering apparatus of claim 1 wherein:

(a) each of said support members has an inner hub ring and an outer hub ring securely fixed to the inner and outer peripheries thereof, respectively, and (b) said plurality of polymer outlets are provided in said inner hub ring.

18. The polymer filtering apparatus of claim 1 wherein at least one of said plurality of filtration stacks further comprises between said liquid-permeable support member and the adjacent filter member a secondary filter member adapted to mix the polymer and to catch and rupture gel in the polymer.

19. The polymer filtering apparatus of claim 18 wherein said secondary filter member is formed by a sinter of deformed metal grains or short metal fibers with a multitude of sharp edges.

20. The polymer filtering apparatus of claim 1 wherein at least one of said support members itself is arranged to act also as a secondary filter adapted to mix the polymer and to catch and rupture gel in the polymer.

21. The polymer filtering apparatus of claim 20 wherein said secondary filter is formed by a sinter of deformed metal grains or short metal fibers with a multitude of sharp edges.

* * * * *